Aug. 30, 1932.  H. L. WILCOX  1,874,076
SYNCHRONOUS MOTOR STARTER
Filed Oct. 21, 1926  2 Sheets-Sheet 1

INVENTOR.
H. L. Wilcox
BY F. N. Barber
ATTORNEY

Aug. 30, 1932. H. L. WILCOX 1,874,076
SYNCHRONOUS MOTOR STARTER
Filed Oct. 21, 1926   2 Sheets-Sheet 2

INVENTOR.
H. L. Wilcox
BY F. N. Barber
ATTORNEY.

Patented Aug. 30, 1932

1,874,076

UNITED STATES PATENT OFFICE

HARRY L. WILCOX, OF SHAKER HEIGHTS, OHIO, ASSIGNOR TO THE ELECTRIC CONTROLLER & MANUFACTURING COMPANY, OF CLEVELAND, OHIO, A CORPORATION OF OHIO

SYNCHRONOUS MOTOR STARTER

Application filed October 21, 1926. Serial No. 143,098.

My invention relates to starters for synchronous motors. Its object is broadly to provide simple and effective means for disconnecting the field of a synchronous motor from the closed circuit to which it is connected during the starting period, and for connecting it to a source of direct current supply when the motor has reached approximately synchronism. Another object is to provide a starter of the type described which is independent of the time required to accelerate the motor from rest to any predetermined slip down to as low as 3% of synchronous speed. Another object is to provide means whereby the flux in the relay which controls the closing of the field circuit is kept nearly constant until the motor nearly reaches synchronism, at which time the flux subsides quickly. My invention includes the idea of connecting the winding of the relay so as to be energized by all or a portion of the current of the closed circuit containing the field, but preferably adjustably connected to the field discharge resistor whereby the purposes of the last named means may be easily had. If the relay winding is connected in series with the field circuit, a special winding is provided to suit each motor size. Inasmuch as the resistor is always designed to suit the motor size, the same relay winding can be used for a large range of motor sizes by connecting it in shunt to a portion of the field discharge resistor.

Referring to the accompanying drawings, Figs. 1, 2, 3, and 4, show diagrammatically four of the many systems to which my invention is adapted.

Figure 1:
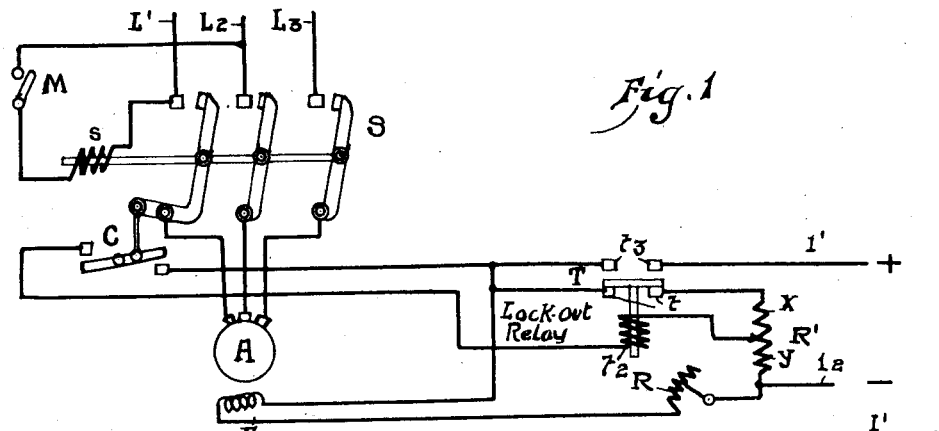

Referring first to Fig. 1, S is an electromagnetic three-pole switch for connecting the armature A of a synchronous motor to the alternating current supply lines L', L2, L3. s is the operating winding for the switch S which is connected across two phases of the supply lines, the circuit of the winding containing a master switch M.

F is the field winding of the motor, and is, when the motor is at rest or stopping, connected in a closed circuit containing the field rheostat R, the field discharge resistor R', and the lower contacts of the relay T. As soon as the master switch M is closed, the winding s is energized and causes the line switch S to close and thereby connects the armature A to the supply lines. As soon as the switch S is closed, the armature A induces a current in the closed field circuit just traced. One of the members of the switch S upon closing closes the auxiliary switch C which completes a second closed circuit in which the said induced current flows from the field winding F through the rheostat R, the portion y of the resistor R', the controlling winding t2 of the relay T, and the auxiliary switch C. The relay T is of the lock-out type which locks the relay open when the current in the operating winding is above a predetermined value and operates the relay when the current in the winding drops to the predetermined value. The relay T is shown with a single coil which may be of the type shown and described in H. R. Canfield's Patent No. 1,344,260. I have used the legend "Lock-out relay" or "Lock-out coil" opposite certain windings to designate this type of magnetically operated relay or contactor. The circuit containing the winding t2 and the switch C is in parallel with the remaining portion x of the resistor R'. The relay is so selected or adjusted that the current in winding t2 due to the drop in voltage across the resistance x is sufficiently high to cause the relay to hold its contacts t closed until the motor almost reaches synchronous speed, or about 97% thereof, at which time current in the winding has become reduced to such a value that it causes the relay T to operate, thereby opening its contacts t and closing its contacts t3. The opening of the contacts t opened the first closed circuit through the resistor R', and the closing of the contacts t3 connected the field winding F to the source of direct current supply indicated by the two supply lines 1', 1², in series with the rheostat R. The winding t2 remains energized, but now with direct current, by current in the circuit from the source 1' through the contacts t3, the switch C, and the portion y of the resistor R'. When the master switch M is opened, the line switch S and the auxiliary switch C drop open and the relay T opens its contacts $t3$, thereby opening the direct-current supply to the field winding F and closing its contacts $t$, thereby reestablishing the first closed circuit described, that including the resistor R'. This closed circuit forms a discharge circuit for the field of the motor.

It will be noticed that one terminal of the winding $t2$ is adjustably connected to the resistor R' whereby the lengths of the portions $x$ and $y$ are varied and the amount of resistance in the portion $x$ which is in shunt with the winding $t2$ can be regulated. With a given number of turns in the winding $t2$, a constant magnetic path for the flux generated by the winding $t2$, and a constant frequency and neglecting the saturation of the iron in the said path, the flux in the relay bears a direct ratio to the alternating voltage applied to the winding. However, if the voltage is held constant while the frequency varies, other conditions remaining unchanged, the flux in the relay will vary inversely as the frequency. Consequently, if the voltage and frequency vary together and compensatingly the flux will remain constant, particularly if the frequency is high and the ratio of reactance to resistance of the winding is large. As the frequency dies out and the ratio of reactance to resistance becomes smaller, the resistance begins to have an increasing effect on decreasing the magnetizing current and the resulting flux. The flux is kept nearly constant until the motor is near a synchronous speed, and then it subsides rapidly and operates the relay. The abruptness of the curve at low voltage and frequency depends on the resistance of the winding, the number of turns therein and the reluctance of the flux path. Low resistance and reluctance and large number of turns tend to keep the flux constant until the lower frequencies are reached. Connecting the winding adjustably to the resistor R' provides a means for easily adjusting the voltage to be applied to the winding for the best results.

Figure 2:
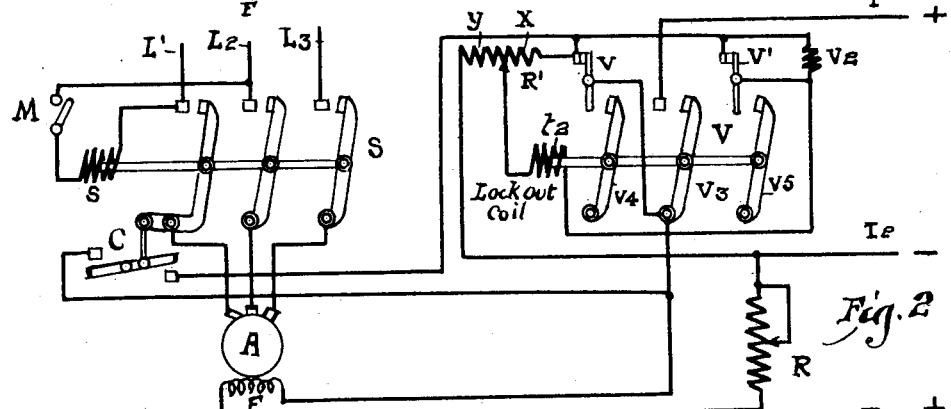

Referring now to Fig. 2, it shows substantially the same system as Fig. 1 adapted for use with a different type of field-controlling switch. The parts which are the same in Figs. 1 to 4 have the same reference characters. When the master switch M is closed, the line switch S and the auxiliary switch C close. The induced current in the field winding F flows through the rheostat R, the resistor R' and the switch $v$, and also through the rheostat R, the portion $y$ of the resistor R', the lock-out relay winding $t2$, the switch $v'$ in shunt with the resistance $v2$, and the switch C. The effects of current in these circuits are precisely as in Fig. 1. The switch is locked open by the winding $t2$ until the current in the winding $t2$ is reduced to the predetermined value at which the relay is set to close, as in Fig. 1. The actuation of the field contactor V by the winding $t2$ causes the switch member $v3$ to connect the source $1'$ of direct current to the field winding F, and also causes the switch members $v4$ and $v5$ to open the switches $v$ and $v'$, the opening of the former opening the first closed or field discharge circuit and the latter removing the short circuit around the resistance $v2$ to reduce the current in the winding $t2$.

Figure 3:
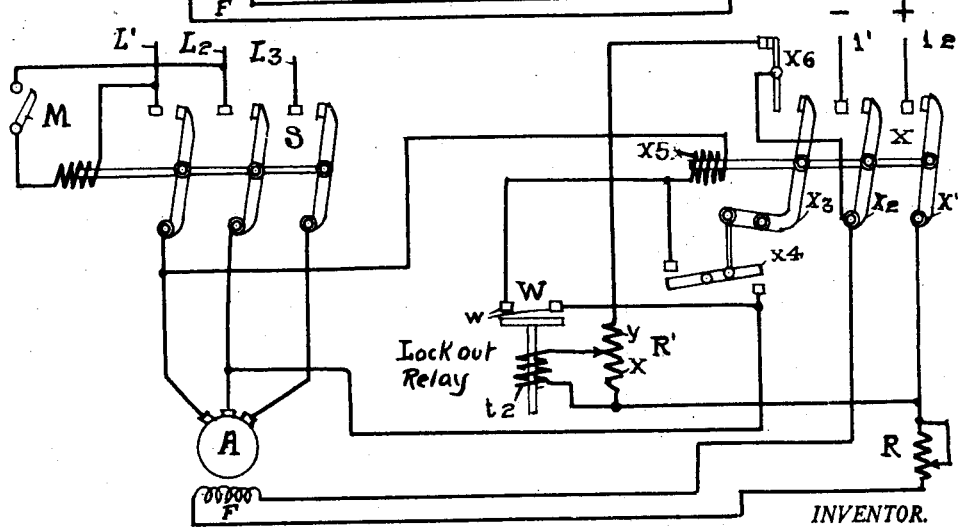

In Fig. 3, the current induced in the field circuit flows through the field F, the field rheostat R, the field discharge resistor R' and the switch $x6$, a portion of the current in this circuit going through the lock-out relay winding $t2$ which is in parallel with the portion $x$ of the resistor R'. When the induced current in the field circuit dies out to a predetermined value, which is when the motor comes up nearly to synchronous speed, the lock-out relay W is closed, connecting its contacts $w$, whereby the operating winding $x5$ for the field contactor X is placed across two of the phases of the line circuit, and the contactor is operated to connect the direct-current lines $1'$, $1^2$ to the field winding F through the switch members $x'$, $x2$. The contactor X has the member $x3$ which, when the contactor closes the direct-current circuit, opens the switch $x6$ and the first closed or field-discharge circuit, and operates the auxiliary switch $x4$ which maintains the winding $x5$ in the said phases of the line circuit, this being necessary since the opening of the switch $x6$ opens the circuit of the relay W which would deenergize the winding $x5$ if it was not at the same time placed in a live circuit.

Figure 4:
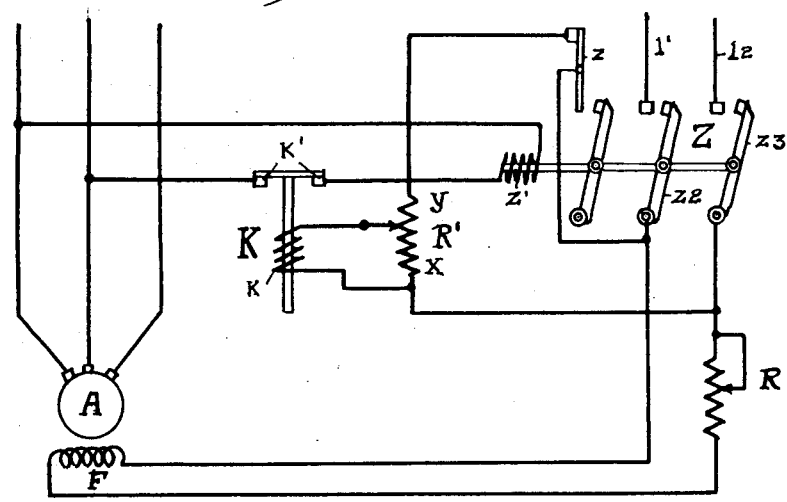

In Fig. 4, the current induced in the field winding flows through the rheostat R, the resistor R', and the switch $z$. A portion of the current just traced flows through the operating winding $k$ of the relay K in shunt with the portion $x$ of the resistor R'. This relay is not of the lock-out type and when its winding $k$ is not excited it closes on its fixed contacts $k'$ and connects the operating winding $z'$ of the field contactor Z in a circuit across two phases of the armature supply lines.

When the armature A is supplied with current the winding $z'$ is energized simultaneously with the energization of the winding $k$. The relay structure is so constructed as to open its contacts $k'$ before the winding $z'$ causes the contactor Z to close. The relay holds its contacts open and therefore the winding $z'$ unenergized until the motor reaches almost synchronous speed, or about 97% thereof. At this time the current in the winding $k$ is too small to hold the relay open. Upon the relay dropping to closed position, the circuit of the winding $z'$ is closed, whereupon the contactor Z is operated, its members $z2$ and $z3$ connecting the direct current lines $1'$ and $1^2$ to the circuit of the field F. The left-hand member of the contactor opens the switch $z$ which opens the closed circuit through the resistor R'. Upon the armature A becoming deenergized the parts return to the positions shown and the motor comes to rest with the resistor R' acting as a field discharge resistor, as in the other forms of my invention shown.

The initial current in the relay windings, due to the voltage applied to the terminals of the windings, produces a flux which assists gravity to hold the relays of Figs. 1 to 3 in their normal positions, and produces a flux to open the contacts of the relay in Fig. 4.

The dying out of the current in the field winding follows a different law from that of the dying out of the current in a relay or contactor winding connected in shunt to the field discharge resistor. Since the reactance of the relay or contactor winding is higher than that of the resistor, less current will flow in the relay winding when the frequency is high though of a sufficient value to perform the initial function of the relay, and more current will flow as the frequency diminishes, thereby maintaining the holding current of a greater value in the relay winding to a point when the motor is closer to synchronous speed than it would if the relay winding was directly connected in series with the field circuit. It is desirable that the field switch remain open until the motor has reached as close to synchronous speed as possible and the use of this connection of the relay winding in shunt to a portion of the resistor, will accomplish this desired effect.

I claim—

1. For the control of the field of a synchronous motor, a closed circuit containing a field winding and a resistance, contacts in said circuit, a circuit in shunt with the said contacts, a winding in the said shunt circuit for positively opening said contacts when the motor nears synchronous speed, there being adjustable resistance in series with the latter winding, a pair of open contacts closed upon the opening of the first contacts, and a source of direct current connected in series with the said field winding when the second contacts are closed.

2. For the control of a synchronous motor, a closed starting circuit containing a motor field winding, normally closed contacts in the circuit, a resistance in the circuit, a closed circuit in shunt with the said contacts, a winding in the latter circuit, a switch member for opening and closing the first circuit, a source of direct current, contacts whereby the switch member connects the source of direct current to the field winding when the said contacts are open, a resistance in the second closed circuit, and means controlled by the current in the winding for opening the said contacts in the first closed circuit and closing the contacts in the direct current circuit, the relative values of the two resistances being adjustable so that the initial value of the induced current in the second closed circuit will cause the switch in the first closed circuit to remain closed when the current in the said second closed circuit is above a predetermined value and a reduced value thereof will cause the switch member to open.

3. For the control of a synchronous motor, a closed starting circuit containing a motor field winding, normally closed contacts and a resistance, a branch circuit in shunt with the contacts and containing a resistance and a winding, a source of direct current, means controlled by the latter winding, for connecting the field winding to the said source, and means for inducing current in the starting circuit, the relative values of the two resistances being adjustable so that the initial value of induced current in the shunt circuit will cause the said switch to remain closed when the current in the said shunt winding is above predetermined value and a lower value thereof will cause the switch to open the starting circuit and close the direct current circuit.

4. For the control of a synchronous motor, a field winding for the motor, a closed circuit containing the field winding, a source of direct current, contacts for connecting the field winding to the source, normally closed contacts in the circuit, a resistance in the circuit, a magnet winding shunted across a portion of the resistance, and an armature controlled by the latter winding and movable to cause the said closed contacts to open and the first contacts to close when the flux produced by the winding falls below a predetermined value, the portion of the resistance shunted by the magnet being adjustable to divert a sufficient proportion of the field current through the magnet winding to produce a flux in the said armature above said predetermined value.

5. For the control of on electric motor system having a field winding, a source of direct current supply, contacts to connect the field winding to the source of supply, a closed circuit including the field winding, a winding in shunt with the contacts, and a movable contact controlled by the winding for causing the opening of the closed circuit and for connecting the source and the latter winding in series with the field winding when the current in the closed circuit falls to a predetermined value.

6. In a motor control system, a motor having a field winding, an excitation circuit for the field winding, a closed starting circuit containing the field winding, a resistance in the latter circuit, a magnet winding connected in shunt with a portion of the resistance, and a relay actuated by the force created by the magnet winding to open the closed circuit and close the excitation circuit.

7. In a motor control system, a motor having a field winding, a resistance, a closed circuit containing the field winding and the resistance, means for inducing a current in the closed circuit, a magnet winding connected in shunt with the resistance, and a relay actuated by the force created by the magnet winding to open the closed circuit a delayed interval of time after the current is induced in the circuit.

8. In a motor control system, a motor having a field winding, a source of supply, a resistance, a closed circuit containing the field winding and the resistance, means for inducing a current in the closed circuit, a magnet winding in shunt with the resistance, and a relay actuated by the magnet winding for connecting the field winding to the source of supply a delayed interval of time after the current is induced in the said circuit.

9. In a motor control system, a motor having a field winding, an excitation circuit for the field winding, a resistance, a closed circuit containing the field winding and the resistance, contacting means for closing the excitation circuit and opening the closed circuit, a magnet winding energized from the drop in voltage across the resistance when current flows therein, and means controlled by the said winding for operating the contacting means.

10. In a motor control system, a motor having a field winding, a source of supply, a contact for connecting the field to the source of supply, a closed circuit containing the field winding, a resistance in the circuit, a normally closed contact in the circuit, and a single coil relay for controlling the closing of the first contact and the opening of the second contact, the coil of the relay being energized by the voltage drop across the said resistance.

11. In a controller for a synchronous motor having an armature and a field winding, a closed starting circuit containing the field winding, a field discharge resistor therein, an excitation circuit for the field winding, means for energizing the motor armature, thereby inducing current in the closed circuit containing the field winding, a magnet winding energized by the drop in voltage across the discharge resistor, and means whereby the winding effects the closing of the excitation circuit and the opening of the closed starting circuit.

12. In a control system for electric motors, a motor having a field winding, a resistance, a circuit containing the field winding and the resistance, a normally closed contact in the circuit, a winding for opening the contact, means for inducing a current in the circuit producing a drop in voltage across the resistance, means including a connection of the winding to the resistance whereby the winding functions to maintain the contact closed when the voltage drop across the resistance is high, and means whereby the winding functions to open the contact when the voltage drop across the resistance is low.

In testimony whereof, I hereunto affix my signature.

HARRY L. WILCOX.